(12) United States Patent
Mahima et al.

(10) Patent No.: US 12,533,552 B2
(45) Date of Patent: Jan. 27, 2026

(54) CONTROLLER AND A METHOD TO DETERMINE A SWIM STROKE

(71) Applicants: Robert Bosch GmbH, Stuttgart (DE); Robert Bosch Engineering and Business Solutions Private Limited, Bangalore (IN)

(72) Inventors: Tomar Mahima, Uttar Pradesh (IN); Mohan Pooja, Kerala (IN); Sengottuvelan Senthilmurugan, Tamilnadu (IN); Pudur Marudhachalam Dheepak, Tamil Nadu (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 321 days.

(21) Appl. No.: 18/043,152

(22) PCT Filed: Jul. 22, 2021

(86) PCT No.: PCT/EP2021/070594
§ 371 (c)(1),
(2) Date: Feb. 27, 2023

(87) PCT Pub. No.: WO2022/042962
PCT Pub. Date: Mar. 3, 2022

(65) Prior Publication Data
US 2023/0321488 A1    Oct. 12, 2023

(30) Foreign Application Priority Data

Aug. 28, 2020   (IN) .............................. 202041037034

(51) Int. Cl.
*A63B 24/00*            (2006.01)

(52) U.S. Cl.
CPC ...... *A63B 24/0003* (2013.01); *A63B 24/0062* (2013.01); *A63B 2024/0071* (2013.01);
(Continued)

(58) Field of Classification Search
None
See application file for complete search history.

(56) References Cited

U.S. PATENT DOCUMENTS 5,099,689 A * 3/1992 McGinn ................. A61B 5/224
73/379.01
5,391,080 A * 2/1995 Bernacki ................ A63B 69/12
434/254

(Continued)

FOREIGN PATENT DOCUMENTS

EP      1 992 389 A1     11/2008
GB      2 176 036 A      12/1986

OTHER PUBLICATIONS

International Search Report corresponding to PCT Application No. PCT/EP2021/070594, mailed Nov. 17, 2021 (English language document) (4 pages).

*Primary Examiner* — Paul A D'Agostino
(74) *Attorney, Agent, or Firm* — Maginot, Moore & Beck LLP (57) ABSTRACT

A controller is connected to receive an input signal from at least one accelerometer. The controller comprises an interface facilitating input and output pins/ports, and a filter module to filter the input signal from at least one accelerometer. The controller includes a stroke segmentation module configured to determine at least two parameters comprising a first parameter and a second parameter from the filtered input signal, generate an envelope signal using the at least two parameters and the filtered input signal, and determine the swim stroke of the swimmer based on the (Continued)

filtered input signal and the envelope signal. Further, an activity detection module is used in combination with the stroke segmentation module.

8 Claims, 6 Drawing Sheets

(52) U.S. Cl.
CPC ..... *A63B 2220/40* (2013.01); *A63B 2220/836* (2013.01); *A63B 2225/60* (2013.01); *A63B 2244/20* (2013.01)

(56) References Cited

U.S. PATENT DOCUMENTS

| | | | |
|---|---|---|---|
| 6,955,542 B2* | 10/2005 | Roncalez | A63B 71/06 434/254 |
| 7,980,998 B2* | 7/2011 | Shemesh | G09B 19/0038 482/901 |
| 8,265,900 B2 | 9/2012 | Irlam et al. | |
| 2002/0165590 A1* | 11/2002 | Crowe | A61N 1/36003 607/48 |
| 2004/0020856 A1* | 2/2004 | Wong | A63B 24/00 210/656 |
| 2004/0112151 A1* | 6/2004 | Maxwell | A61B 5/22 73/865.4 |
| 2007/0143068 A1* | 6/2007 | Pasolini | G01C 22/006 702/160 |
| 2008/0018532 A1* | 1/2008 | Mackintosh | A63B 71/06 342/357.57 |
| 2008/0046179 A1* | 2/2008 | Mackintosh | A63B 24/0062 702/182 |
| 2008/0205195 A1* | 8/2008 | Van Der Merwe | G10K 15/02 367/137 |
| 2008/0214360 A1* | 9/2008 | Stirling | A61B 5/6807 482/9 |
| 2008/0284650 A1* | 11/2008 | Macintosh | A63B 24/0021 342/357.57 |
| 2009/0209878 A1* | 8/2009 | Sanger | A61B 5/389 600/546 |
| 2009/0221403 A1* | 9/2009 | Chan | A63B 24/0062 482/8 |
| 2009/0240119 A1* | 9/2009 | Schwaibold | G16H 50/30 600/301 |
| 2009/0288545 A1* | 11/2009 | Mann | G09B 15/00 84/484 |
| 2010/0204952 A1* | 8/2010 | Irlam | G04G 21/02 702/141 |
| 2010/0210975 A1* | 8/2010 | Anthony, III | A61B 5/1123 600/595 |
| 2011/0176578 A1* | 7/2011 | Zei | A61B 5/0507 374/E11.001 |
| 2013/0053990 A1* | 2/2013 | Ackland | A63B 24/00 700/91 |
| 2014/0039839 A1* | 2/2014 | Yuen | G01C 21/3878 702/189 |
| 2014/0125480 A1* | 5/2014 | Utter, II | G16H 50/30 340/539.12 |
| 2014/0129008 A1* | 5/2014 | Utter, II | G16H 20/30 700/92 |
| 2014/0277628 A1* | 9/2014 | Nieminen | G06V 40/23 700/91 |
| 2014/0278229 A1* | 9/2014 | Hong | H04W 4/027 702/160 |
| 2014/0354434 A1* | 12/2014 | Lalonde | G06F 16/44 340/573.1 |
| 2015/0282768 A1* | 10/2015 | Luna | A61B 5/0205 600/386 |
| 2016/0058372 A1* | 3/2016 | Raghuram | A61B 5/681 600/595 |
| 2016/0148609 A1* | 5/2016 | Beck | G10H 3/125 84/731 |
| 2016/0228640 A1* | 8/2016 | Pindado | A61N 1/37282 |
| 2016/0270717 A1* | 9/2016 | Luna | A61B 5/743 |
| 2017/0039358 A1* | 2/2017 | Yuen | A61B 5/7267 |
| 2017/0053542 A1* | 2/2017 | Wilson | G06F 3/011 |
| 2017/0188864 A1* | 7/2017 | Drury | A61B 5/02427 |
| 2017/0294096 A1* | 10/2017 | Webb | G08B 21/0453 |
| 2017/0311867 A1* | 11/2017 | Stankus | A61B 5/02405 |
| 2018/0056123 A1* | 3/2018 | Narasimha Rao | G09B 19/0038 |
| 2018/0056128 A1* | 3/2018 | Narasimha Rao | G06F 18/2135 |
| 2018/0056129 A1* | 3/2018 | Narasimha Rao | A61B 5/7221 |
| 2018/0200579 A1* | 7/2018 | Davis | A63B 69/12 |
| 2018/0277013 A1* | 9/2018 | Van Halteren | G16H 50/30 |
| 2018/0296157 A1* | 10/2018 | Bleich | A61B 7/00 |
| 2018/0338709 A1* | 11/2018 | Krans | A61B 5/1118 |
| 2018/0368737 A1* | 12/2018 | Bonomi | A61B 5/7264 |
| 2019/0076054 A1* | 3/2019 | Banet | A61B 5/318 |
| 2019/0311608 A1* | 10/2019 | Murphy | G08B 29/185 |
| 2019/0381356 A1* | 12/2019 | Huang | A63B 71/0622 |
| 2021/0068713 A1* | 3/2021 | Dervisoglu | A61B 5/0205 |
| 2023/0351876 A1* | 11/2023 | Pooja | G06F 18/24 |

* cited by examiner

CONTROLLER AND A METHOD TO DETERMINE A SWIM STROKE

This application is a 35 U.S.C. § 371 National Stage Application of PCT/EP2021/070594, filed on Jul. 22, 2021, which claims the benefit of priority to Serial No. IN 202041037034, filed on Aug. 28, 2020 in India, the disclosures of which are incorporated herein by reference in their entirety.

The disclosure relates to a controller to determine swim stroke of a swimmer and a method thereof.

BACKGROUND

Currently available products are using IMU sensor based solution for stroke segmentation. In existing swim tracking solution, the swim stroke segmentation is done mainly using either gyroscope or magnetometer. However, the power consumption of gyroscope or magnetometer is higher than that of accelerometer.

According to a prior art U.S. Pat. No. 8,265,900, a motion analysis device for sports is disclosed. There is described a portable wrist worn device for determining information about the movement of a human body when swimming. The device comprises a waterproof housing containing: an accelerometer operable to generate an acceleration signal; a processor operable to process the acceleration signal so as to generate one or more metrics relating to the movement of the human body; and a means for feedback of the one or more metrics to the user. The accelerometer may be operable to generate an acceleration signal along an axis parallel to the proximo-distal axis of the user's arm in use and/or the accelerometer may be operable to generate an acceleration signal along an axis parallel to the dorsal-palmar axis of the user's hand in use. The device may also be used in sports other than swimming.

According to an exemplary embodiment of the disclosure, a controller is for determining a swim stroke of a swimmer. The controller is connected to receive an input signal from at least one accelerometer. The controller includes a filter module and a stroke segmentation module. The filter module is configured to filter the input signal from the at least one accelerometer. The stroke segmentation module is configured to (i) determine at least two parameters comprising a first parameter and a second parameter from the filtered input signal, (ii) generate an envelope signal using the at least two parameters and the filtered input signal, and (iii) determine the swim stroke of the swimmer based on the filtered input signal and the envelope signal.

According to another exemplary embodiment of the disclosure, a method is for determining a swim stroke of a swimmer. The method includes filtering an input signal from at least one accelerometer using a filter module, and determining at least two parameters comprising a first parameter and a second parameter from the filtered input signal using a stroke segmentation module. The method also includes generating an envelope signal using the at least two parameters and the filtered input signal, and determining the swim stroke of the swimmer based on the filtered input signal and the envelope signal.

BRIEF DESCRIPTION OF THE DRAWINGS

An embodiment of the disclosure is described with reference to the following accompanying drawings.

DETAILED DESCRIPTION

Figure 1:
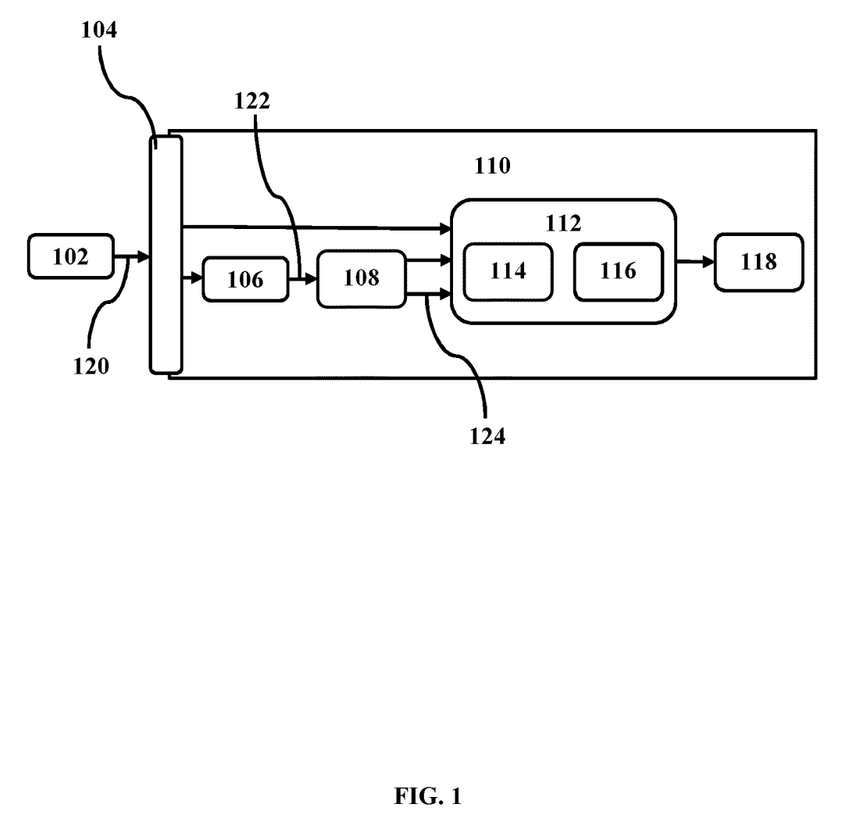
FIG. 1 illustrates a block diagram of a controller to determine swim stroke of a swimmer, according to an embodiment of the disclosure.

FIG. 1 illustrates a block diagram of a controller to determine swim stroke of a swimmer, according to an embodiment of the disclosure. The controller 110 connected to receive input signals 120 from at least one sensor, i.e. an accelerometer 102. The accelerometer 102 is either a single axis sensor or multi axis sensor. The controller 110 comprises an interface 104 facilitating input and output pins/ports, and a filter module 106 to filter the input signal 120 from the at least one accelerometer 102. The controller 110, characterized by, a stroke segmentation module 108 adapted to determine at least two parameters comprising a first parameter 208 (shown in FIG. 2) and a second parameter 210 (shown in FIG. 2) from said filtered signal 122, generate an envelope signal 206 (shown in FIG. 2) using the at least two parameters and the filtered signal 122, and determine the swim stroke of the swimmer based on the filtered signal 122 and the envelope signal 206.

Figure 2:
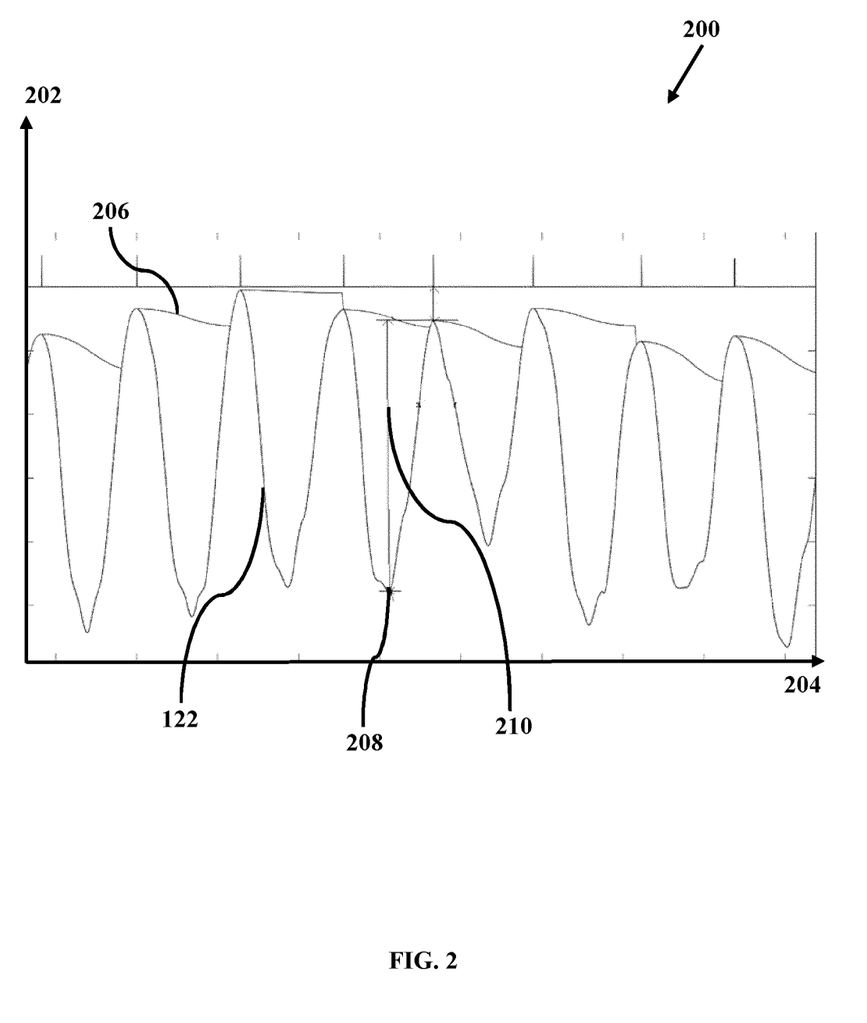
FIG. 2 illustrates a graph waveforms of filtered signal and envelope signal, according to an embodiment of the disclosure.

The filtered signal 122 consists of peaks that correspond to the swim strokes. The stroke segmentation module 108 calculates the first parameter 208 present in the filtered signal 122, which is further used for calculating the second parameter 210. The first parameter 208 of a previous stroke segment is overwritten by the first parameter 208 of a current stroke segment. The first parameter 208 comprises a local minima of peaks in the filtered signal 122, and the second parameter 210 comprises a relative amplitude of the peak based on the calculated local minima, i.e. the first parameter 208. The filter module 106 is either part of the stroke segmentation module 108 or is external to the same.

With reference to the calculation of the second parameter 210, whenever filtered signal 122 starts decreasing after rising to a peak, the stored first parameter 208 is used to calculate the second parameter 210. The second parameter 210 is calculated as the distance from local minima of that peak to highest value of the peak, as shown in FIG. 2. The calculated second parameter 210 is then used for generation of the fall rate of the envelope signal 206.

An output signal 124 from the stroke segmentation module 108 and the activity detection module 112 together is used to update the stroke count in a memory 118.

The controller 110 is an electronic control unit to process signals received from sensors. The controller 110 comprises memory 118 such as Random Access Memory (RAM), Read Only Memory (ROM), Analog-to-Digital Converter (ADC) and vice-versa DAC, clocks, timers and a processor connected with the components through bus channels. The aforementioned modules are logics or instructions which are stored in the memory 118 and accessed by the processor as per the defined routines. The internal components of the controller 110 is not used or explained for being state of the art, and the same must not be understood in a limiting manner.

The controller 110 is usable in wearable devices. The wearable device 100 is any one selected from but not limited to a smart watch, a smart band, a smart ring and the like.

FIG. 2 illustrates a graph waveforms of filtered signal and envelope signal, according to an embodiment of the disclosure. The graph 200 depicts the signals along with the first parameter 208 and the second parameter 210. An X-axis 204 signifies number of samples, and the Y-axis 202 signifies acceleration in suitable unit such as m/s². The filtered signal 122 is shown to be a like a sinusoidal wave. The envelope signal 206 is generated in dependence of the filtered signal 122. The first parameter 208 is represented by lowest point of a valley. The second parameter 210 is represented by a line segment. Whenever a reference to the filtered signal 122 and the envelope signal 206 is made, it is understood to be a value in the respective signal, and the same must not be understood in a limiting manner.

The operation and working of the stroke segmentation module 108 is now explained with reference to the FIG. 1 and FIG. 2. The stroke segmentation module 108 adapted to generate the envelope signal 206 based on a fall rate and a state of an internal state machine having two states, namely, a 'FOLLOW' state and a 'FALL' state. The envelope signal 206 is generated with reference to the filtered signal 122. The stroke segmentation module 108 identifies an instant of a raw stroke segment based on the envelope signal 206 and the filtered signal 122, and determine a true instant of stroke segment after validation.

Before the raw instant of the stroke segment is identified, the stroke segmentation module 108 is configured to generate a fall rate for the envelope signal 206. The identification of the raw instant of the stroke segment and determination of the true instant of the stroke segment after validation of the raw instant is performed next. In the process of generation of fall rate, the stroke segmentation module 108 configured to set an initial state of the internal state machine to the 'FALL' state, and calculate the fall rate of the envelope signal 206 based on the second parameter 210. An initial value of the envelope signal 206 is set equal to a value of the filtered signal 122. The stroke segmentation module 108 then calculates value of the envelope signal 206 as sum of current value of the envelope signal 206 and a value of the fall rate. The fall rate is dependent on configurable decay time of the envelope signal 206. For example, if a total decay time (T) of the envelope signal 206 is set equal to 2.5 sec, then the fall rate of the envelope signal 206 is calculated based on the time from which the envelope signal 206 starts falling. The fall time is divided into groups of three, i.e. [0–T/2], [T/2–T] and [greater than T].

$$\text{Fall rate }(t) = \begin{cases} m1*t & 0 \le t \le T/2 \\ m2*t - a2 & T/2 < t \le T \\ -0.2f & t > T \end{cases}$$

Where,

Coefficients m1, m2 and a2, which are the envelope fall rate parameters depend on second parameter 210 and are calculated as follows:

$$m1 = 8*\text{abs(second parameter)}*\frac{(M-1)}{(T*T)}$$

$$m2 = 8*\text{abs(second parameter)}*\frac{(M-K)}{(T*T)}$$

$$a2 = 8*\text{abs(second parameter)}*\frac{(M-K)}{T}$$

Value of coefficient 'M' is kept as 0.6 and coefficient 'K' is kept as 0.2. Please note that the values provided above is for clear understanding and might change as per requirements. The same must not be understood in limiting manner.

In the process of identification of the raw instant, the stroke segmentation module 108 is configured to maintain the 'FALL' state of the internal state machine as long as the filtered signal 122 is below the envelope signal 206. The envelope signal 206 continues to decay at the generated fall rate. The switching of the internal state machine is explained below. The state of the internal state machine switches from the 'FALL' state to the 'FOLLOW' state when the filtered signal 122 increases and crosses the envelope signal 206. Now, the envelope signal 206 follows the filtered signal 122. In another instance, the state of the internal state machine switches from the 'FOLLOW' state to the 'FALL' state when the filtered signal 122 becomes lesser than the envelope signal 206. Now the envelope signal 206 decays at recalculated fall rate. The switch from the 'FOLLOW' state to the 'FALL' state is the identification of raw instant of the stroke segment.

In the process of determining the true instant of the stroke segment, the stroke segmentation module 108 is configured to validate the raw instant of the stroke segment of the swim stroke with reference to a configurable but empirically derived value. The validated stroke is considered to be as determined swim stroke segment. For example, if 1.5 seconds is considered to be fast stroke rate and 3 seconds is considered to be slow stroke rate, then stroke rate threshold is set to be equal to 1.3 seconds. If time difference between the raw instant of the stroke segment and a previous instant of the stroke segment is less than 1.3 seconds, then the current raw instant is classified as false segmentation instant. But if the time difference is greater than 1.3 seconds, but less than maximum stroke periodicity limit of 9 seconds, then the current raw instant is classified as true segmentation instant. This is just an example and must not be understood in a limiting manner.

In accordance to an embodiment of the disclosure, an activity detection module 112 is provided. The activity detection module 112 comprises an extraction module 114 and a decision engine 116. The extraction module 114 extracts feature vectors from the filtered signal 122 and the input signal 120. The decision engine 116 classifies the detected activity to be a swim activity/session or non-swim activity/session. The activity detection module 112 is independently usable for the defined purpose.

The feature vectors used by the activity detection module 112 is selected from a group comprising a maximum value of velocity of current stroke segment ($\text{MaxVel}_{cr}$), a difference between maximum value of velocity of a current stroke segment ($\text{MaxVel}_{cr}$) and maximum value of velocity of a previous stroke segment ($\text{MaxVel}_{pr}$), a difference between mean of acceleration data of current segment ($\text{MeanX/Y/Z}_{cr}$) and mean of acceleration data of second previous segment ($\text{MeanX/Y/Z}_{sp}$), a difference between peak point of filtered acceleration data of current segment ($\text{PeakPoint}_{cr}$) and peak point of filtered acceleration data of previous segment ($\text{PeakPoint}_{pr}$), a difference between maximum value of filtered acceleration data (MaxFiltAccX) and minimum value of filtered acceleration data (MinFiltAccX) for a stroke segment, and a rate of change of acceleration (RateAccelX/Y/$Z_{cr}$). The subscripts used corresponds to: cr—current; pr—previous; sp—second previous; Th—threshold.

The working of the decision engine 116 is explained. Initially, the decision engine 116 computes the MaxVel$_{cr}$ and checks for first condition. If MaxVel$_{cr}$ exceeds velocity threshold, the decision engine 116 determines that it is a non-swim session. If the first condition does not pass, then the decision engine 116 checks for second condition comprising whether the difference between MaxVel$_{cr}$ and MaxVel$_{pr}$ exceeds velocity difference threshold. Along with the second condition, a third condition is checked which comprises whether difference between MeanX/Y/$Z_{cr}$ and MeanX/Y/$Z_{sp}$ exceeds mean difference threshold. If both the second and the third conditions are satisfied, then the decision engine 116 determines a non-swim session. If both the second and third conditions are also not passed, then the decision engine 116 checks for the fourth condition comprising the polarity of peak point of current stroke segment and the previous stroke segment. If polarities are opposite, then the decision engine 116 checks a fifth condition comprising whether amplitude difference between PeakPoint$_{cr}$ and the PeakPoint$_{pr}$ is greater than peak difference threshold. If this condition is satisfied, then the decision engine 116 determines a non-swim session. If not, the decision engine 116 checks for sixth condition. In the sixth condition, difference between MaxFiltAccX and MinFiltAccX of that segment is taken. Based on empirically derived values, it is observed that for swim sessions, the difference is high compared to non-swim sessions. If the difference is greater than difference threshold and also if a seventh condition comprising the RateAccelX/Y/$Z_{cr}$ is greater than rate threshold, then the decision engine 116 determines a swim session. If the sixth and the seventh conditions are also not passed, but if it satisfies an eight condition, i.e. it is the first stroke segment, then the decision engine 116 determines it as a swim session. The reason is because use of the difference between current and previous segment values for the first stroke segment is not applicable. If the eight condition is also not passed, then the decision engine 116 determines as a non-swim session.

Once the stroke segment is determined as a non-swim activity, then a stroke count in the memory 118 during for the determined stroke segment is not incremented. This helps to reduce false positives of strokes obtained during rest/pause time or any other non-swim activity in between the swim sessions, thus helping to improve stroke count accuracy.

According to an embodiment of the disclosure, once the stroke segment is determined from the acceleration based stroke segmentation module 108, the same is verified whether the stroke segment is obtained during a swim session or a non-swim session through the activity detection module 112. The swim session indicates that the swimmer is performing one of the different stroke styles such as freestyle, backstroke, butterfly, breaststroke and any other stroke. The non-swim session indicates that the swimmer is either taking a turn or is taking rest/pause in between swim sessions or any other activity. The stroke count is updated only when swim session is detected. In case of non-swim session, stroke count is kept constant. The stroke count is saved in the memory 118. For determining whether the determined stroke segment is obtained during the swim session or the non-swim session, the activity detection module 112 is designed using input signal 120.

Figure 3:
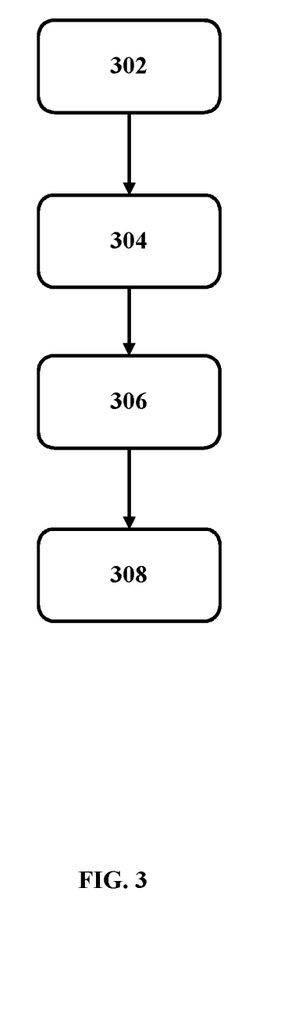
FIG. 3 illustrates a method of determining swim stroke of the swimmer, according to the disclosure.

FIG. 3 illustrates a method of determining swim stroke of the swimmer, according to the disclosure. The method comprises plurality of steps, of which a step 302 comprises filtering input signal 120 from the at least one accelerometer 102 using the filter module 106. The method is characterized by, using a stroke segmentation module 108 for performing a step 304 comprising determining at least two parameters comprising the first parameter 208 and the second parameter 210 from the filtered signal 122. A step 306 comprises generating the envelope signal 206 using the at least two parameters and the filtered signal 122. A step 308 comprises determining the swim stroke of the swimmer based on the filtered signal 122 and the envelope signal 206.

The first parameter 208 comprises the local minima of peaks in the filtered signal 122, and the second parameter 210 comprises the relative amplitude of the peak based on the calculated local minima. The second parameter 210 is calculated in dependence of the first parameter 208.

The stroke segmentation module 108 is configured for generating the envelope signal 206 based on the fall rate and the state of the internal state machine having two states, namely, the 'FOLLOW' state and the 'FALL' state. The envelope signal 206 is generated with reference to the filtered signal 122. The stroke segmentation module 108 also performs identifying the raw instant of the stroke segment followed by determining the same to be the true instant of stroke segment after validation.

The stroke segmentation module 108 is configured to generate the fall rate for the envelope signal 206, identify the raw instant of the stroke segment and determine the true instant of the stroke segment after validation of the raw instant.

Figure 4:
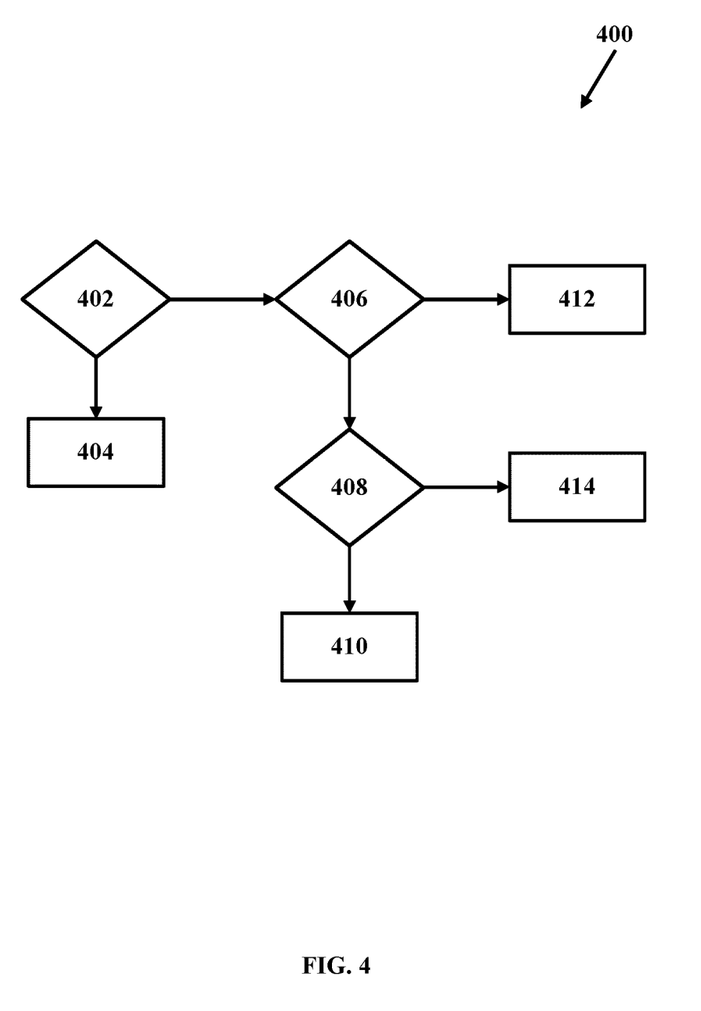
FIG. 4 illustrates generation of fall rate for the envelope signal, according to an embodiment of the disclosure.

FIG. 4 illustrates generation of fall rate for the envelope signal, according to an embodiment of the disclosure. The stroke segmentation module 108 is configured to generate the fall rate for the envelope signal 206, identify the raw instant of the stroke segment and determine the true instant of the stroke segment after validation of the raw instant. The steps involved in the fall rate generation method 400 are explained. A step 402 comprises checking if the state is 'FALL'. If no, then the step 404 is executed, where the fall rate is set to zero. If yes, then a step 406 is executed. The step 406 comprises checking if the fall time of the envelope signal 206 is less than or equal to T/2, where the T corresponds to total decay time of the envelope signal 206. If result of the step 406 is a yes, then the step 412 is executed which comprises setting the fall rate to m1 multiplied by the fall time of the envelope signal 206. If result of the step 406 is a no, then step 408 is executed, which comprises checking if the fall time of the envelope signal 206 is greater than T/2 and less than or equal to T. If result of the step 408 is a yes, then the step 414 is executed, which comprises setting fall rate to m2 multiplied with fall time of the envelope signal 206 and subtraction of a constant. If result of the step 408 is a no, then the step 410 is executed, which comprises setting the fall rate to −0.2f. The generation of the envelope signal 206 is already explained in the description of FIG. 2, and a flow diagram of the same is described here for ease of understanding.

Figure 5:
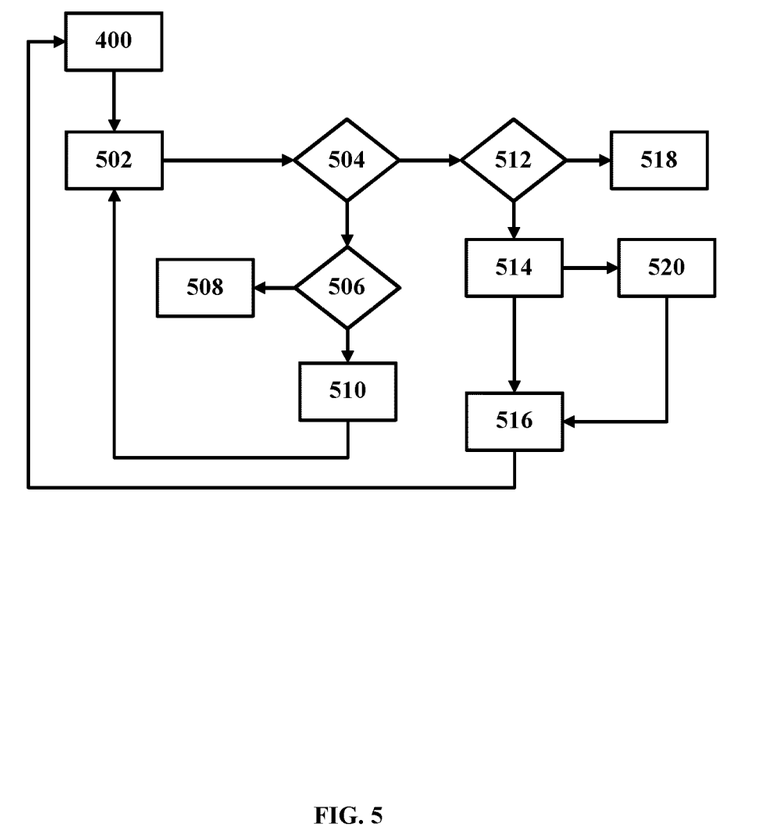
FIG. 5 illustrates identification of raw instant of stroke segment, according to an embodiment of the disclosure.

FIG. 5 illustrates identification of raw instant of stroke segment, according to an embodiment of the disclosure. The identification of the stroke segment is explained below. A step 400 comprises generating fall rate for the envelope signal 206. The step 400 is explained in FIG. 4. A step 502 comprises generating the envelope signal 206, which comprises considering the initial values if it is the first instance. A step 504 comprises checking if the state is 'FALL'. If result of step 504 is a yes, then the step 506 is executed, else a step 512 is executed. The step 506 comprises checking if the filtered signal 122 is greater than the envelope signal 206. If the result of the step 506 is a yes, then a step 510 is executed which is setting the state to 'FOLLOW'. The step 510 directs to step 502 after change in the state. If result of the step 506 is a no, then the step 508 is executed which comprises continuing the envelope signal 206 without changes in the state. Now, the step 512 comprises checking if the filtered signal 122 is greater than or equal to the envelope signal 206. If result of the step 512 is a yes, then the step 518 is executed which comprises setting the state to 'FOLLOW'. If result of the step 512 is a no, then a step 514 is executed which comprises setting the state to 'FALL'. Once, the step 514 is executed, then step 520 is executed which comprises calculating the first parameter 208, followed by the execution of a step 516 which comprises recalculation of second parameter 210. The step 516 directs to the step 400 for the generation of fresh fall rate for the next phase. The FIG. 5 is flow diagram for ease in understanding, and the same has been already described under FIG. 2 description.

Figure 6:
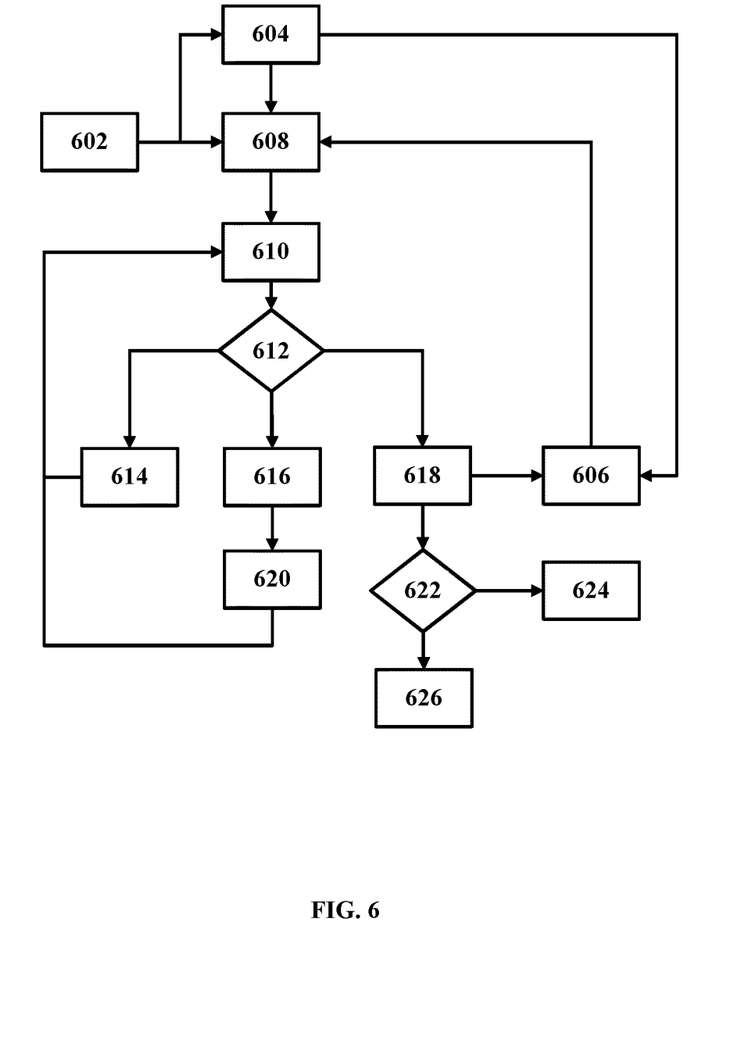
FIG. 6 illustrates a detailed flow diagram of the method to determine the swim stroke of a swimmer, according to the disclosure.

FIG. 6 illustrates a detailed flow diagram of the method to determine the swim stroke of a swimmer, according to the disclosure. A step 602 comprises filtering the input signal 120 from the at least one accelerometer 102. The input signal 120 of a dominant axis is chosen and filtered to a cutoff frequency to remove artifacts such as jerks, and high frequency noises. A step 604 comprises calculation of first parameter 208, which is followed by step 606 where the second parameter 210 is calculated. The step 608 comprises generation of fall rate for the envelope signal 206 based on inputs from step 604 and step 606. A step 610 comprises generation of envelope signal 206 based on generated fall rate in the step 608. At step 612 the state transition of internal state machine is checked, which changes based on the filtered signal 122 and the envelope signal 206. A step 614 corresponds to no transition in state, which directs to step 610. A step 616 corresponds to state transition from 'FALL' to 'FOLLOW'. If step 616 is detected, then a step 620 is executed, which comprises setting the envelope signal 206 equal to filtered signal 122, i.e. the envelope signal 206 follows the filtered signal 122. The step 620 then directs to the step 610. A step 618 corresponds to detection of state transition from 'FOLLOW' to 'FALL', which if detected triggers the step 606 to recalculate the second parameter 210, i.e. the relative amplitude for new stroke segment. Also a step 622 is executed, which indicates an identification of the raw instant of stroke segment. In step 622, a stroke periodicity condition is checked. If passed, then the flow directs to step 624 which indicates that a true stroke segment has been determined. If it fails, then flow directs to step 626, which indicates that a false stroke segment is detected.

The method also comprises using an activity detection module 112 for enabling validation of the identified stroke segment. The activity detection module 112 is configured for extracting feature vectors from the filtered signal 122 and the input signal 120, and processing the extracted feature vectors to determine the identified stroke segment to be any one of the swim activity and the non-swim activity. The activity detection module 112 comprises an extraction module 114 and a decision engine 116. The extraction module 114 is used for extracting feature vectors from the filtered signal 122 and the input signal 120. The decision engine 116 is used for classifying the detected activity to be the swim activity/session or non-swim activity/session. The method of the activity detection module 112 is independently usable for the defined purpose.

The feature vectors used by the activity detection module 112 is selected from a group comprising the maximum value of velocity of current stroke segment ($MaxVel_{cr}$), the difference between maximum value of velocity of the current stroke segment ($MaxVel_{cr}$) and maximum value of velocity of the previous stroke segment ($MaxVel_{pr}$), the difference between mean of acceleration data of current segment ($MeanX/Y/Z_{cr}$) and mean of acceleration data of second previous segment ($MeanX/Y/Z_{sp}$), the difference between peak point of filtered acceleration data of current segment ($PeakPoint_{cr}$) and peak point of filtered acceleration data of previous segment ($PeakPoint_{pr}$), the difference between maximum value of filtered acceleration data (MaxFiltAccX) and minimum value of filtered acceleration data (MinFiltAccX) for the stroke segment, and the rate of change of acceleration ($RateAccelX/Y/Z_{cr}$).

The working of the decision engine 116 is already explained under the FIG. 2 description, and is avoided here for simplicity. The absence of the same description here must not be taken as a limitation.

Once the stroke segment is determined as a non-swim activity, then a stroke count in the memory 118 during for the determined stroke segment is not incremented. This helps to reduce false positives of strokes obtained during rest/pause time or any other non-swim activity in between the swim sessions, thus helping to improve stroke count accuracy. When both the output signal 124 and the result of the decision engine 116 indicates the occurrence of stroke segment, then only the method increments the stroke count in the memory 118. The stroke count is then ready to be displayed on a display screen of the device.

According to an embodiment of the disclosure, once the stroke segment is determined from the acceleration based stroke segmentation module 108, the same is verified whether the stroke segment is obtained during a swim session or a non-swim session through the activity detection module 112. The swim session indicates that the swimmer is performing one of the different stroke styles such as freestyle, backstroke, butterfly, breaststroke and any other stroke. The non-swim session indicates that the swimmer is either taking a turn or is taking rest/pause in between swim sessions or any other activity. The stroke count is updated only when swim session is detected. In case of non-swim session, stroke count is kept constant. The stroke count is saved in the memory 118. For determining whether the determined stroke segment is obtained during the swim session or the non-swim session, the activity detection module 112 is designed using input signal 120.

According to the disclosure, the accelerometer 102 based swim tracking solution is provided. The accelerometer 102 based swim stroke segmentation is used for swimmers with different skills and different stroke styles such as freestyle, backstroke, breaststroke and butterfly, etc. The disclosure is based on accelerometer 102 sensor based solution only, thus reducing the overall cost. The disclosure opens up market for different segments of wearable products. Thus, only one sensor, i.e. the accelerometer 102 is needed, which results in low power consumption. Further, the stroke segmentation works irrespective of sign of peak of input signal 120.

It should be understood that embodiments explained in the description above are only illustrative and do not limit the scope of this disclosure. Many such embodiments and other modifications and changes in the embodiment explained in the description are envisaged. The scope of the disclosure is only limited by the scope of the claims.

We claim:

1. A controller for determining a swim stroke of a swimmer, the controller comprising:
a non-transitory memory storing program instructions that implement a filter module and a stroke segmentation module; and
a processor operably connected to the non-transitory memory, the processor being configured to:
receive an input signal from at least one accelerometer;
execute the filter module to filter the input signal; and
execute the stroke segmentation module to:
determine at least two parameters comprising a first parameter and a second parameter from the filtered input signal, the first parameter being local minima of peaks in the filtered input signal, the second parameter being relative amplitudes of the peaks, the relative amplitudes being differences between the local minima of the peaks and local maxima of the peaks,
generate an envelope signal using the at least two parameters and the filtered input signal, the envelope signal coinciding with the local maxima of the peaks and decaying between the local maxima of the peaks, and
determine the swim stroke of the swimmer based on the filtered input signal and the envelope signal.

2. The controller as claimed in claim 1, wherein the processor further executes the stroke segmentation module to:
generate the envelope signal based on a fall rate and a state of an internal state machine having two states, the envelope signal generated with reference to the filtered input signal,
identify an instant of a raw stroke segment based on the envelope signal and the filtered input signal, and
determine a true instant of the identified raw stroke segment after validation.

3. The controller as claimed in claim 2, wherein:
the non-transitory memory further stores program instructions that implement an activity detection module; and
the processor is configured to execute the activity detection module to:
extract features vectors from the input signal and the filtered input signal, and
process the extracted feature vectors to determine the identified raw stroke segment to be one of a swim activity and a non-swim activity.

4. The controller as claimed in claim 3, wherein the feature vectors extracted using the activity detection module include at least one of (i) a maximum value of a velocity of a current stroke segment, (ii) a difference between the maximum value of the velocity of the current stroke segment and a maximum value of a velocity of a previous stroke segment, (iii) a difference between a mean of acceleration data of the current stroke segment and a mean of acceleration data of a second previous stroke segment, (iv) a difference between a peak point of filtered acceleration data of the current stroke segment and a peak point of filtered acceleration data of the previous stroke segment, (v) a difference between a maximum value of filtered acceleration data and a minimum value of filtered acceleration data for a stroke segment, and (vi) a rate of change of acceleration.

5. A method for determining a swim stroke of a swimmer, the method comprising:
receiving, with a processor, an input signal from at least one accelerometer, the processor being operably connected to a non-transitory memory storing program instructions that implement a filter module and a stroke segmentation module;
filtering the input signal using the filter module with the processor;
determining, using the stroke segmentation module with the processor, at least two parameters comprising a first parameter and a second parameter from the filtered input signal, the first parameter being local minima of peaks in the filtered input signal, the second parameter being a relative amplitude of the peaks, the relative amplitudes being differences between the local minima of the peaks and local maxima of the peaks;
generating, using the stroke segmentation module with the processor, an envelope signal using the at least two parameters and the filtered input signal, the envelope signal coinciding with the local maxima of the peaks and decaying between the local maxima of the peaks; and
determining, using the stroke segmentation module with the processor, the swim stroke of the swimmer based on the filtered input signal and the envelope signal.

6. The method as claimed in claim 5, further comprising:
generating, using the stroke segmentation module with the processor, the envelope signal based on a fall rate and a state of an internal state machine having two states, the envelope signal generated with reference to the filtered input signal, and
identifying, using the stroke segmentation module with the processor, a raw instant of a stroke segment followed by determining the raw instant to be a true instant of stroke segment after validation.

7. The method as claimed in claim 6, wherein the non-transitory memory further stores program instructions that implement an activity detection module, the method further comprising:
validating the identified stroke segment, using an activity detection module with the processor, by:
extracting feature vectors from the filtered input signal, and
processing the extracted feature vectors to determine the identified stroke segment to be one of a swim activity and a non-swim activity.

8. The method as claimed in claim 7, wherein the feature vectors extracted using the activity detection module include at least one of (i) a maximum value of a velocity of a current stroke segment, (ii) a difference between the maximum value of the velocity of the current stroke segment and a maximum value of a velocity of a previous stroke segment, (iii) a difference between a mean of acceleration data of the current stroke segment and a mean of acceleration data of a second previous stroke segment, (iv) a difference between a peak point of filtered acceleration data of the current stroke segment and a peak point of filtered acceleration data of the previous stroke segment, (v) a difference between a maximum value of filtered acceleration data and a minimum value of filtered acceleration data for a stroke segment, and (vi) a rate of change of acceleration.

* * * * *